May 28, 1968     J. P. WILKERSON     3,385,103

PIPE LEAK INDICATING APPARATUS

Filed April 25, 1966

John P. Wilkerson
INVENTOR.

BY Hayden & Pravel

ATTORNEYS

United States Patent Office 3,385,103
Patented May 28, 1968

3,385,103
PIPE LEAK INDICATING APPARATUS
John P. Wilkerson, Pasadena, Tex., assignor to Loomis Hydraulic Testing Company, Inc., a corporation of Texas
Filed Apr. 25, 1966, Ser. No. 544,909
4 Claims. (Cl. 73—45.5)

ABSTRACT OF THE DISCLOSURE

An apparatus for indicating leaks in pipes wherein a cylindrical shell is provided with a lateral sealing disk at its lower end so that the pipe, including any collars, joints, or other enlargements, may pass through the sealing disk without losing the liquid in the shell. The interior of the pipe being tested is pressurized, and any leak in the pipe will be indicated as bubbles in the liquid in the shell.

---

In recent years, well pipe such as steel pipe and casing used in oil wells, have been tested in sections as the well pipe is added and lowered into a well bore. One tool presently used for such testing is disclosed in U.S. Patent No. 3,165,920; such tool employs water and gas internally of the well pipe. Although leaks in the well pipe can be detected by the use of only water or some other liquid, it has been found that smaller leaks such as at threaded pipe joints are often missed when using liquid as the test fluid whereas they are discovered when using a gas as the test fluid. However, the use of gas as the detecting fluid has introduced the further problem of obtaining an indication to the operator when the gas is leaking from internally of the pipe to an area externally thereof.

So far as known, efforts to solve such problem have consisted of wiping soap over the pipe area being subjected to the internal gas pressure, or using expensive gas detection equipment, neither of which have been practical for oilfield operations.

It is therefore an object of this invention to provide an apparatus which is simple and rugged for positively and instantly indicating the presence and location of leaks in well pipe and the like when a gas testing tool is disposed internally of the pipe.

An important object of this invention is to provide a new and improved pipe leak indicating apparatus which is adapted to movably retain a quantity of liquid externally of a pipe being tested so that relative longitudinal movement of the liquid with respect to the pipe is accomplished without requiring any release or attachment of the apparatus and the pipe as it is moved from one position to another.

The preferred embodiment of this invention will be described hereinafter, together with other features thereof, and additional objects will become evident from such description.

Figure 1:
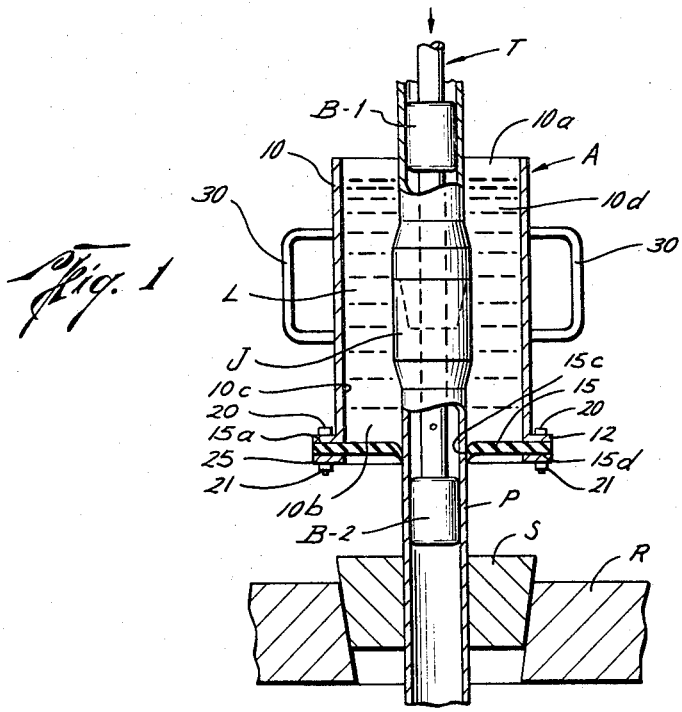
Figure 2:
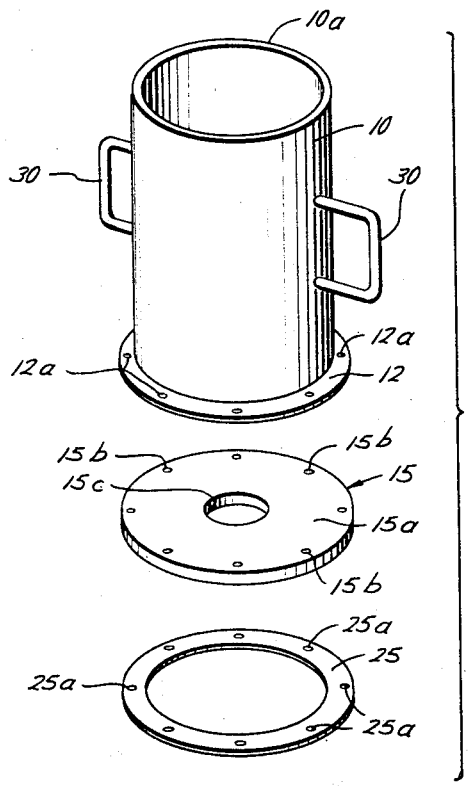

The invention will be more readily understood from a reading of the following specification and by reference to the accompanying drawings forming a part thereof, wherein an example of the invention is shown, and wherein:

FIG. 1 is a view, partly in elevation and partly in section, illustrating the apparatus of the present invention in use for indicating leaks in a well pipe; and, FIG. 2 is an exploded view of the pipe leak indicating apparatus of this invention in its preferred embodiment.

In the drawings, the letter A designates generally the apparatus of this invention which is employed in conjunction with a test tool T, preferably of the type disclosed in U.S. Patent No. 3,165,920. The test tool T is of the type which tests with both water and gas and is disposed internally of a well pipe P. The present apparatus A of this invention is disposed externally of the well pipe P (FIG. 1) while the test tool T is internally of such pipe P. Under normal circumstances, the well pipe P is supported in the usual manner as it is being lowered into the well bore by slip S disposed in a rotary table R or similar supporting structure. As each section of the well pipe P is added to the length of pipe being lowered into the well bore, it is customary to test each section for leaks, particularly at the pipe joints such as indicated at J (FIG. 1). Therefore, the pipe P is temporarily held in a position with the section to be tested disposed above the slips S and the test tool T is disposed internally of the pipe P. With the present invention, the apparatus A is used to indicate leaks which occur when gas is used as the test fluid in conjunction with the test tool T. It is important to note that the apparatus A is disposed with respect to the pipe P so that relative movement between the apparatus A and the pipe P may occur when desired to add the additional sections of pipe, and each section may be tested with the apparatus A.

Considering the invention more in detail, the apparatus A includes a cylinder or shell 10 which is preferably formed of steel, although other materials such as plastic may be employed if desired. The shell 10 has an open upper end 10a and an open lower end 10b. The inner surface 10c of the shell 10 is spaced from the external surface of the pipe P which is being tested so as to provide an annular space 10d in which liquid L is disposed, as will be more fully explained.

At the lower end of the shell 10, an annular flange 12 is mounted, preferably either integrally with the shell 10 or welded or otherwise attached thereto. Such annular flange 12 has a plurality of holes 12a therethrough for receiving bolts or other securing means as will be explained.

A flexible sealing disk 15, formed of rubber or other flexible material, is disposed in the bottom opening 10b, with an annular portion of its upper surface 15a in engagement with the lower surface of the flange 12. Preferably, the disk 15 has a plurality of holes 15b which correspond with the holes 12a and through which the bolts 20 (FIG. 1) are adapted to extend.

The disk 15 has a central opening 15c which is adapted to engage in sealing contact with the external surface of the well pipe P or other pipe being tested. Thus, the diameter of the opening 15c is slightly less than the external diameter of the pipe P at its smallest point. It is to be observed that the opening 15c is preferably disposed in the center of the disk 15, although it may be displaced to one side or the other under certain circumstances. Also, the opening 15c must be large enough to permit the passage of the pipe joint J therethrough without tearing or rupturing the disk 15.

A connecting ring 25 having a plurality of openings 25a for also receiving the bolts 20 is adapted to be disposed below the disk 15 and in alignment with the flange 12 (FIG. 1). Such ring 25 is also preferably formed of steel or other metal, but it may be formed of plastic or some other material if adequate strength is provided. The connecting ring 25 engages a lower annular portion 15d of the disk 15 (FIG. 1) so that when the disk 15 is fully assembled as shown in FIG. 1, the bolts 20 are releasably connected to the flange 12, the disk 15 and the ring 25 by means of a nut 21 on each of the bolts 20. Although other retaining means besides the bolts 20 and the nuts 21 may be employed for mounting the disk 15 at the bottom opening 10b of the sleeve or shell 10, such construction is preferred because it facilitates the replacement of the disk 15 when wear occurs on the disk 15 at the opening 15c.

The clamping of the disk 15 between the flange 12 and the ring 25 provides enough rigidity to the disk 15 at the external portion to support the water or other liquid L which is in the annular space 10d thereabove. At the same time, the inner portion of the disk 15 is still flexible enough to allow the relative movement between the disk 15 and the pipe P when sections of the pipe P are added to the pipe string.

The apparatus A may be supported in any suitable manner during use so that relative movement between the pipe P and the apparatus A may occur when adding new sections of the pipe P to the string. As illustrated in the drawings, the apparatus A may be held in position and relative movement between the apparatus A and the pipe P may occur by the use of one or more handles 30 which are welded or otherwise attached to the external surface of the shell 10. Such handles 30 may be supported by an elevator in a derrick or a cable from overhead or any other suitable support means, or the handles 30 may simply be grasped by one or more operators.

In the operation or use of the apparatus A of the present invention, the apparatus A may be initially passed over the upper end of the pipe P which is exposed above the ground, or the first section of the pipe P may be lowered through the opening 15c when the apparatus A is disposed substantially above the slips S.

The liquid L is disposed within the shell 10 to fill at least a portion of the annular space 10d. In the normal case, the height of the liquid L will be sufficient to span the area spanned by the test tool T or some predetermined portion thereof. For example, if the apparatus A is of such a height that the liquid L is less than the area between the area spanned by the test tool T, the apparatus A may be moved upwardly or downwardly while the test tool T has the gas supplied thereto so that tests are made at different points along the pipe P for each position of the test tool T and so as to cover the entire area between the packing or seal elements such as indicated at B–1 and B–2 (FIG. 1).

With the apparatus A in any selected position with respect to the pipe P, and with the tool T inside or internally of the pipe P, the gas such as nitrogen is introduced to the test tool T in the known manner as explained in U.S. Patent No. 3,165,920. Such gas is confined between the packing elements B–1 and B–2 and is illustrated in FIG. 1 as spanning a pipe joint J. In the event there is a leakage of the gas through the threaded connection at the joint J or through a defective area in the pipe P, such gas will leak outwardly and through the water or other liquid L to thus cause bubbles in such liquid L which are visible to an operator. Preferably the open upper end 10a of the apparatus A provides for such visibility of any bubbles which may thus appear in the liquid L, although the shell 10 may be made of a transparent plastic such as methyl methacrylate so that the bubbles may be viewed through the wall of the shell 10.

Thus, with the present invention, the liquid L may be moved from one position to another with respect to the pipe P, the pipe P may be moved downwardly or upwardly with respect to the apparatus A, and at the same time, the internal testing equipment may be manipulated within the pipe P. During all of such relative longitudinal movement, the annular surface at the opening 15c maintains a seal with the pipe P even when passing over each joint J, due to the fact that the diameter of the opening 15c is slightly smaller than the smallest portion of the pipe P engaged thereby. The apparatus A is simple and rugged in construction so that it is a very practical construction for oil well operations. In addition, it is relatively inexpensive since no vacuum pump or pressure pump is required.

The foregoing disclosure and description of the invention is illustrative and explanatory thereof and various changes in the size, shape and materials, as well as in the details of the illustrated construction, may be made within the scope of the appended claims without departing from the spirit of the invention.

I claim:

1. An external leak indicating apparatus for use in conjunction with a gas-type testing tool disposed internally of a pipe, comprising:
   (a) a substantially cylindrical shell adapted to be disposed externally of the pipe being tested and with its longitudinal central axis parallel to the longitudinal axis of the pipe,
   (b) said shell having an inner substantially cylindrical surface spaced from the external surface of the pipe being tested to provide an annular space therebetween,
   (c) said annular shell having an open bottom,
   (d) a flexible sealing disk disposed substantially perpendicular to said longitudinal central axis of said shell for closing said open bottom,
   (e) said flexible sealing disk having a substantially central opening which is slightly smaller than the external surface of the pipe being tested for sealing engagement with said external surface during relative longitudinal movement between the disk and the pipe being tested, whereby a quantity of liquid may be movably retained in at least a portion of said annular space,
   (f) connector means connecting said flexible disk at only the lower annular end of said shell, and
   (g) said flexible disk being unconnected and unrestrained from said central opening outwardly to substantially said inner surface so that said flexible disk is capable of flexing from its central opening outwardly substantially to said inner surface to thereby permit collars, joints, and other enlargements on the pipe to also pass said flexible disk while maintaining a seal therebetween.

2. The structure set forth in claim 1, including:
   (a) an annular flange on the lower end of said sleeve adapted to be engaged by an upper annular portion of said flexible sealing disk, and
   (b) said connector means having:
      (1) a connecting ring corresponding in size and shape to said annular flange and disposed below said sealing disk in engagement with a lower annular portion of said flexible sealing disk, and
      (2) retaining means releasably retaining said flexible sealing disk between said annular flange and said connecting ring for providing sufficient rigidity to said disk to retain the liquid thereabove in the sleeve without preventing the flexibility of the inner portion of the disk for sealing action as relative movement with respect to the pipe occurs.

3. The structure set forth in claim 1, including:
   (a) handle means mounted on the external surface of said sleeve for effecting relative movement between the apparatus and the pipe.

4. The structure set forth in claim 1, wherein:
(a) said sleeve has an open upper end to expose the liquid in the sleeve to an operator, whereby gas bubbles from the test tool internally of the pipe being tested are visible in such liquid.

References Cited

UNITED STATES PATENTS

| 784,483 | 3/1905 | Erk | 73—46 |
| 1,273,914 | 7/1918 | O'Sullivan | 73—45.6 |
| 2,264,515 | 12/1941 | Fear | 73—46 |
| 2,287,340 | 6/1942 | Browall | 73—40.5 |
| 2,587,192 | 2/1952 | Meyer | 73—46 |
| 2,761,311 | 9/1956 | Baker | 73—46 |
| 2,766,613 | 10/1956 | Williams | 73—45.5 |

FOREIGN PATENTS 812,848   9/1951   Germany.

DAVID SCHONBERG, *Primary Examiner.*

LOUIS R. PRINCE, *Examiner.*

J. NOLTON, *Assistant Examiner.*